US010533351B2

(12) United States Patent
Yano (10) Patent No.: US 10,533,351 B2
(45) Date of Patent: Jan. 14, 2020

(54) INTERIOR APPARATUS OF A VEHICLE (71) Applicant: KOJIMA INDUSTRIES CORPORATION, Toyota-shi, Aichi-ken (JP)

(72) Inventor: Toshiki Yano, Toyota (JP)

(73) Assignee: KOJIMA INDUSTRIES CORPORATION, Toyota-shi (JP)

( * ) Notice: Subject to any disclaimer, the term of this patent is extended or adjusted under 35 U.S.C. 154(b) by 16 days.

(21) Appl. No.: 16/015,157

(22) Filed: Jun. 21, 2018

(65) Prior Publication Data
US 2018/0371808 A1 Dec. 27, 2018

(30) Foreign Application Priority Data
Jun. 23, 2017 (JP) .................. 2017-122855

(51) Int. Cl.
B60R 7/04 (2006.01)
B60R 11/00 (2006.01)
E05B 83/32 (2014.01)
E05B 85/22 (2014.01)

(52) U.S. Cl.
CPC ............. E05B 83/32 (2013.01); B60R 7/04 (2013.01); E05B 85/22 (2013.01); B60R 2011/0007 (2013.01); E05Y 2900/538 (2013.01)

(58) Field of Classification Search
CPC ... B60R 7/04; B60R 2011/0007; E05B 83/32; E05B 85/22; E05Y 2900/538
USPC .................................................... 296/24.34
See application file for complete search history.

(56) References Cited

U.S. PATENT DOCUMENTS

| 7,731,258 | B2 * | 6/2010 | Bazinski | B60N 2/793 296/37.8 |
| 2007/0080553 | A1 * | 4/2007 | Kim | B60R 7/04 296/37.1 |
| 2009/0066102 | A1 * | 3/2009 | Shiono | B60R 7/04 296/24.34 |
| 2009/0256376 | A1 * | 10/2009 | Schneider | B60R 7/04 296/24.34 |
| 2012/0043778 | A1 * | 2/2012 | Brant | B60R 7/04 296/24.34 |
| 2013/0057011 | A1 * | 3/2013 | Yamagishi | B60R 7/04 296/24.34 |
| 2013/0270286 | A1 * | 10/2013 | Fukui | B65D 51/00 220/811 |
| 2015/0258923 | A1 * | 9/2015 | Skapof | B60R 7/04 296/24.34 |
| 2018/0371808 | A1 * | 12/2018 | Yano | E05B 83/32 |
| 2019/0257123 | A1 * | 8/2019 | Suzuki | B60R 7/04 |

FOREIGN PATENT DOCUMENTS

JP 2015030369 A 2/2015

* cited by examiner

Primary Examiner — Gregory A Blankenship
(74) Attorney, Agent, or Firm — Hunton Andrews Kurth LLP (57) ABSTRACT A hook of a lock structure is rotatably supported by a knob. Therefore, a biasing force of a hook biasing spring can be regulated independently from a knob biasing spring. Accordingly, the biasing force of the hook biasing spring can be regulated smaller than a biasing force of the knob biasing spring. As a result, sounds generated when locking the lock structure can be decreased.

8 Claims, 11 Drawing Sheets

INTERIOR APPARATUS OF A VEHICLE

This application claims priority to Japanese Patent Application No. 2017-122855, filed in Japan on Jun. 23, 2017, the entire contents of all are hereby incorporated by reference.

TECHNICAL FIELD

The present invention relates to an interior apparatus of a vehicle, for example, a center console of a vehicle.

BACKGROUND

Figure 11:
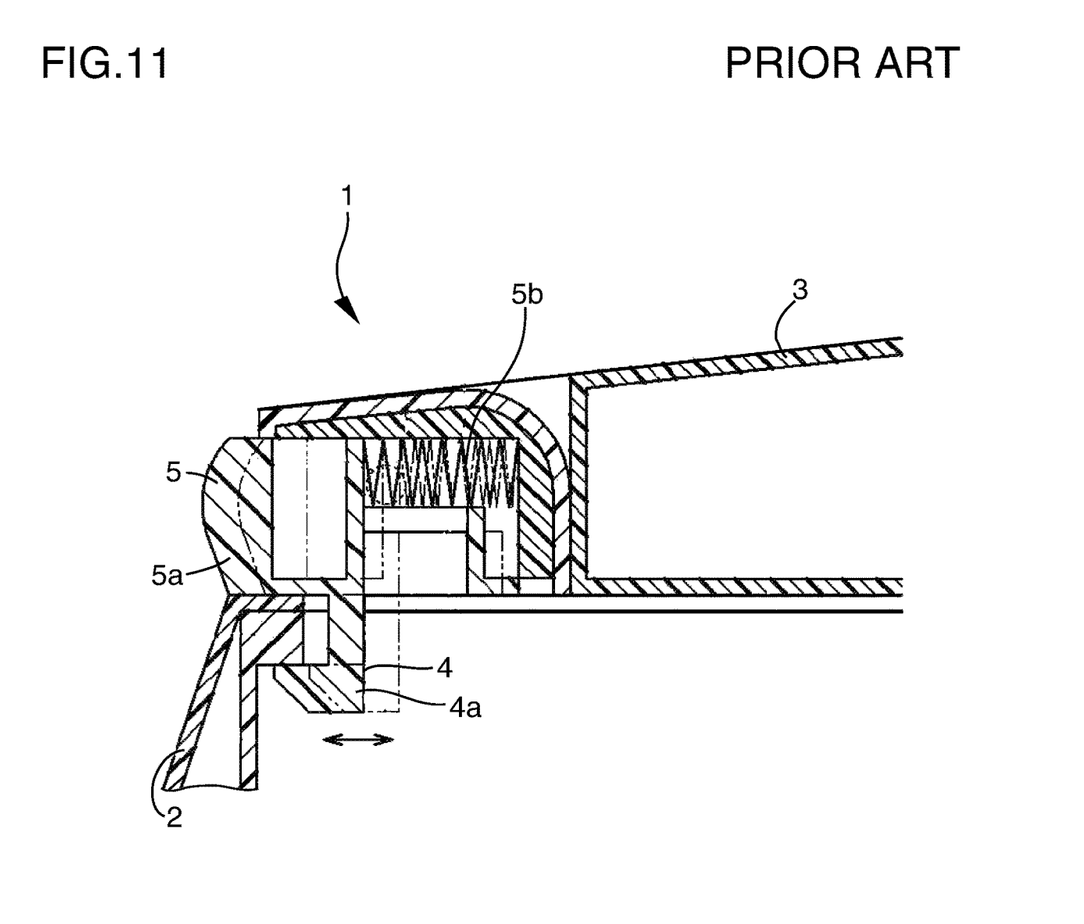
FIG. 11 is a partial cross-sectional view of a conventional interior apparatus of a vehicle.

As illustrated in FIG. 11, Japanese Patent Publication 2015-30369 discloses a conventional center console 1 of a vehicle having a lock structure 4 for locking a lid 3 to a container 2 when the lid 3 is at a closed position and a lock releasing structure 5. The lock structure 4 includes a hook 4a capable of engaging the container 2. The lock releasing structure 5 includes a push-type knob 5a and a knob biasing spring 5b for biasing the knob 5a relative to the lid 3. The hook 4a of the lock structure 4 is formed integral with the knob 5a of the lock releasing structure 5. The lock structure 4 and the lock releasing structure 5 are operated as follows: At a time of locking the lid 3 to the container 2, when the lid 3 is rotated toward a closing position, the hook 4a is moved in a direction opposite a knob-push direction together with the knob 5a pushed by a protrusion formed at an upper end of the container 2. When the hook 4a has passed the protrusion of the container 2, the hook 4a is moved in the knob-push direction together with the knob 5a biased by the knob biasing spring 5b. When the hook 4a collides with the container 2, the hook 4a stops and engages the protrusion of the container 2. At a time of releasing the lock, the knob 5a is pushed thereby moving the hook 4a in the direction opposite the knob-push direction together with the knob 5a and releasing an engagement of the hook 4a with the protrusion of the container 2. Then, the lid 3 is rotated upward by a hand.

However, there are the following problems with the conventional console:

(i) Since the hook 4a is formed integral with the knob 5a of the lock releasing structure 5, a knob operating load and a locking load of the lock structure 4 are a biasing load of the knob biasing spring 5 and are equal to each other. Therefore, a sound generated when the hook 4a collides with the container 2 at the time of locking is considerably loud.

(ii) Since the hook 4a is formed integral with the knob 5a of the lock releasing structure 5, not only the hook 4a but also the knob 5a slide relative to the lid 3 at the time of locking. Therefore, the sound generated at the time of locking is increased due to the sliding of the hook 4a and the knob 5 relative to the lid 3.

BRIEF SUMMARY

Object of the Invention

An object of certain embodiments of the present invention is to provide an interior apparatus of a vehicle which can decrease the sound generated at a lock structure at a time of locking a lid to a container.

Means for Solving the Aforementioned Problems

The present invention for achieving the above object can include the following aspects: According to a first aspect of the invention, an interior apparatus of a vehicle comprises a container, a lid rotatably supported by the container so as to be rotatable between an open position and a closed position of the lid, a lock device for locking the lid to the container when the lid is at the closed position, and a lock releasing device, provided at the lid, for releasing the locking of the lid to the container. In the interior apparatus of a vehicle, the container includes a hook receiving portion provided at the container. The lock releasing device includes a knob of a push-type supported by the lid so as to be movable straight in a knob moving direction including push and opposite-push directions of the knob and a knob biasing spring for biasing the knob in the opposite-push direction of the knob. The lock device includes a hook, rotatably supported by the knob so as to be rotatable along a plane parallel to the knob moving direction, having an engaging portion capable of engaging the hook receiving portion at a tip of the hook and a hook biasing spring for rotationally biasing the hook in a direction in which the engaging portion of the hook engages the hook receiving portion of the container.

According to a second aspect, the knob includes a slide rail extending in the knob moving direction. The lid includes a slide rail guide extending in the knob moving direction. The slide rail slides guided by the slide rail guide.

According to a third aspect, the knob includes an operating portion and a hook supporting portion where the hook is rotatably supported by the knob. The slide rail is provided at the hook supporting portion.

According to a fourth aspect, the hook includes a shaft portion and an engaging portion. The hook is rotatably supported by the knob at the shaft portion of the hook. The hook engages the hook receiving portion of the container at the engaging portion of the hook when the lid is at the closed position. The hook supporting portion of the knob includes a side wall and a bottom wall. The slide rail is provided at the side wall of the hook supporting portion. An opening through which the hook extends is formed at the bottom wall of the hook supporting portion.

According to a fifth aspect, a biasing force of the hook biasing spring for biasing the engaging portion of the hook to the hook receiving portion of the container is set smaller than a biasing force of the knob biasing spring for biasing the engaging portion of the hook to the hook receiving portion of the container via the knob.

According to a sixth aspect, the knob includes an operating portion, a hook supporting portion for supporting the hook and a spring supporting portion for supporting the knob biasing spring. The operating portion, the hook supporting portion and the spring supporting portion are disposed in an order of the operating portion, the hook supporting portion and the spring supporting portion. The hook is rotatably supported by the knob at the hook supporting portion.

According to a seventh aspect, the container includes a front wall which is constructed from a frontmost wall or a wall provided inside the frontmost wall. The hook receiving portion is constructed from a hole formed at the front wall of the container.

According to an eighth aspect, in the first aspect, the interior apparatus of a vehicle is a center console of a vehicle.

Technical Advantages

According to the first aspect, since the hook of the lock device is rotatably supported by the knob, a biasing force of the hook biasing spring can be set independently from the knob biasing spring. When the biasing force of the hook biasing spring is set smaller than the biasing force of the knob biasing spring, a sound generated when the hook collides with the container at the time of locking the lock structure can be decreased.

Further, since the hook of the lock device is rotatably supported by the knob, it is possible to move the hook without moving the knob when locking the lock device. Therefore, when locking the lock device, a sound generated due to sliding of the hook relative to the lid can be decreased.

According to the second aspect, since the knob includes the slide rail extending in the knob moving direction and the lid includes the slide rail guide extending in the knob moving direction, the knob can smoothly move relative to the lid.

In order to move the knob smoothly relative to the lid, the slide rail is required to have a certain length in the knob moving direction. According to the third aspect, since the slide rail is provided at the hook supporting portion, the hook supporting portion has a length equal to or larger than the certain length of the slide rail in the knob moving direction. As a result, the hook supporting portion is long in the knob moving direction, so that a space for disposing the hook in the hook holding portion can be obtained easily.

According to the fourth aspect, since the hook includes the shaft portion, the hook can be supported by the knob at the shaft portion of the hook. Further, since the opening through which the hook extends is formed at the bottom wall of the hook supporting portion of the knob, even in the case where the hook is rotatably supported by the hook supporting portion of the knob, the hook can engage the hook receiving portion of the container at the engaging portion of the hook.

According to the fifth aspect, since the biasing force of the hook biasing spring is set smaller than the biasing force of the knob biasing spring, a sound generated when the hook collides with the container at the time of locking the lock structure can be decreased.

According to the sixth aspect, since the operating portion, the hook supporting portion and the spring supporting portion are disposed in that order, the hook can be disposed on a front side of the spring supporting portion. As a result, a distance between the operating portion and the engaging portion of the hook is made short in a front-rear direction of the vehicle so that a housing space of the container can be made large.

According to the seventh aspect, since the hook receiving portion is constructed from a hole formed at the front wall of the container, the engaging portion of the hook can engage the hook receiving portion of the container by rotating the hook along the plane parallel to the front-rear direction of the vehicle.

According to the eighth aspect, since the interior apparatus of a vehicle is a center console of a vehicle, not only a decrease in a sound noise at the time of lock and lock releasing of the console can be achieved, but also an increase in the size of the housing space of the console can be achieved.

DETAILED DESCRIPTION

An interior apparatus 10 of a vehicle (hereinafter, merely, "an apparatus 10") according to an embodiment of the present invention will be explained with reference to FIGS. 1-10. In the drawings, "UP" shows an upper direction and "FR" shows a front direction of a vehicle.

Figure 1:
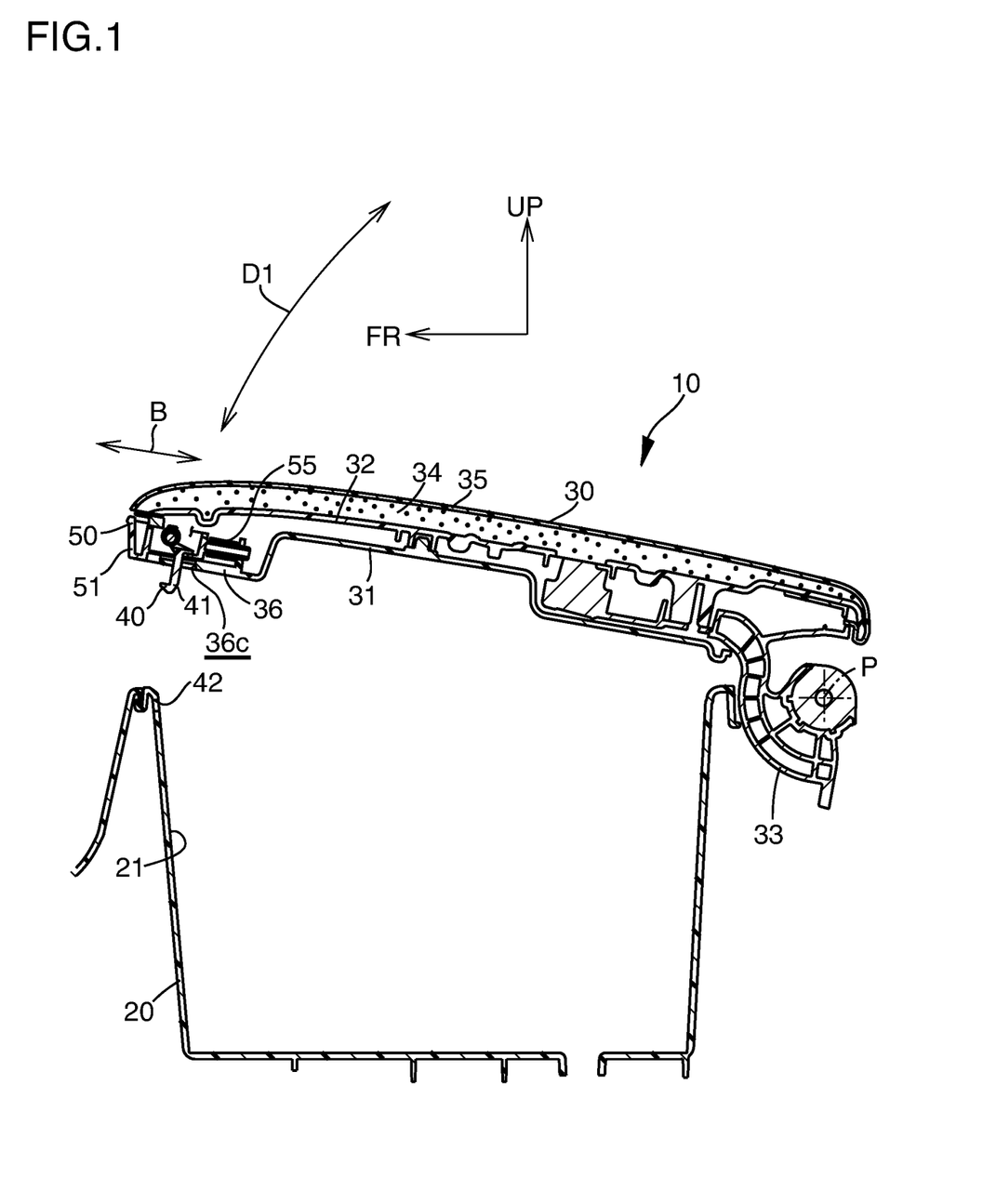
FIG. 1 is a cross-sectional view of an interior apparatus of a vehicle according to FIG. 1.

As illustrated in FIG. 1, the apparatus 10 according to the present invention may be, for example, a center console of a vehicle disposed between a driver seat and a front passenger seat of a vehicle, though not limited to the center console of a vehicle. The apparatus 10 may be a glove box disposed at an instrument panel in front of the front passenger seat of a vehicle. In the embodiment and drawings described hereinafter, the center console of a vehicle will be taken as an example of the apparatus 10.

The apparatus 10 may include (i) a container 20 (which may be called a console box), (ii) a lid 30 rotatable relative to the container 20 between an open position and a closed position of the lid 30, (iii) a lock device 40 (which may be called a locking device) for locking the lid 30 to the container 20 when the lid 30 is at the closed position and (iv) a lock releasing device (which may be called an unlocking device) 50 provided at the lid 30.

The lock releasing device 50 includes (i) a knob 51 of a push-type (hereinafter, a push-type knob 51) supported by the lid 30 so as to be movable straight in a knob moving direction including push and opposite-push directions of the knob and (ii) a knob biasing spring 55 for biasing the knob 51 relative to the lid 30 in the opposite-push direction.

The lock device 40 includes a hook 41 rotatably supported by the knob 51 and a hook biasing spring 43 for rotationally biasing the hook 41. The hook 41 has an engaging portion 41*b* capable of engaging the container 20.

The container 20 includes a hook receiving portion 42 (shown in FIGS. 1 and 5) for receiving the engaging portion 41*b* of the hook 41 to thereby lock the lid 30 to the container 20 when the lid 30 is at the closed position.

Each structural element will be explained below in more detail.

[Container]

The container 20 may be a box-like container having a bottom wall, a front wall, a rear wall and side walls and has a housing space 21 therein. The housing space 21 opens upward. The container 20 is fixed to a floor panel (not shown) of a vehicle. The hook receiving portion 42 may be constructed from a hole means formed at the front wall of the container 20.

[Lid]

The lid 30 is rotatably coupled to the container 20 so as to be rotatable about a rotational axis P disposed at or near a rear end portion of the lid 30. The lid 30 is rotatable relative to the container 20 in a direction of an arcuate arrow D1 shown in FIG. 1 (i.e., an up-down direction). When the lid 30 is at the closed position, the housing space 21 is covered with the lid 30 from an upside. When the lid 30 is at the closed position, the lid 30 can be used as an arm rest. When opening the lid 30 by rotating the lid 30 about the rotational axis P from the closed position to the open position, the lid 30 is raised up manually after the lock device 40 has been unlocked.

The lid 30 includes an inner member 31, an outer member 32 and a hinge 33.

The inner member 31 and the outer member 32 may be made from resin. The outer member 32 and the inner member 31 may be fixedly coupled with each other. A urethane pad 34 and a surface layer (skin) 35 may be provided at the outer member 32. The hinge 33 may be made from metal. The hinge 33 may be fixed to the outer member 32. Alternatively, the hinge 33 may be fixed to the inner member 31 or to both of the inner member 31 and the outer member 32. The lid 30 is rotatably supported by the container 20 at the hinge 33.

Figure 2:
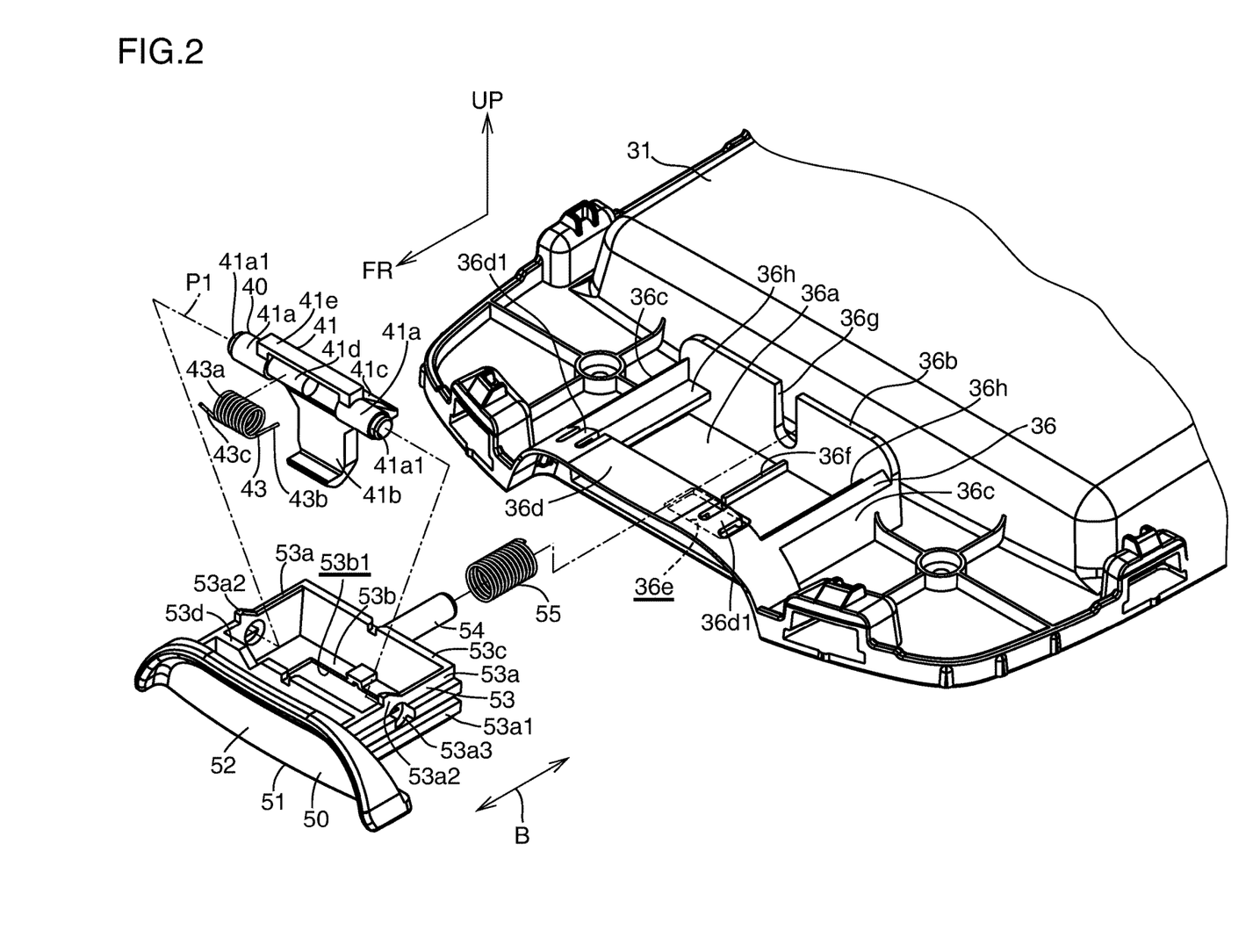
FIG. 2 is an enlarged, developed perspective view of the interior apparatus of a vehicle according to FIG. 1 where parts including an inner member of a lid, a knob, a hook, a knob biasing spring and a hook biasing spring are decoupled from each other.

As illustrated in FIG. 2, the lid 30 has a slidable holding portion 36 at a front portion of the inner member 31 of the lid 30, for slidably holding the lock releasing device 50 such that knob 51 is slidable relative to the lid 30. The slidably holding portion 36 has a bottom wall 36a, a rear wall 36b rising upwardly from a rear end of the bottom wall 36a, a pair of side walls 36c rising upwardly from opposite ends of the bottom wall 36a in a right-left direction of the bottom wall 36a, and a bridge 36d connecting front portions of the upper ends of the pair of side walls 36c to each other.

A penetrating aperture 36e and a guide 36f are provided at the bottom wall 36a. The guide 36f extends straightly from an edge of the penetrating aperture 36e to the rear wall 36b. A slit 36g extending downward from an upper end of the rear wall 36b is formed at the rear wall 36b. A slide rail guide 36h is provided at an inside surface of each of the pair of side walls 36b. The knob 51 is slidably supported by the slide rail guide 36h so as to move in a knob moving direction B. The knob moving direction B is a front-rear direction of a vehicle when the lid 30 is at the closed position. The bridge 36d connects the front end portions of the pair of side walls 36c to each other. A stopper receiving portion 36d1 is provided at the bridge 36d in order to prevent the knob 51 from being drawn out from the lid 30.

[Lock Device]

The lock device 40 includes the hook 41 rotatably supported by the knob 51 and a hook biasing spring 43. The hook 41 is rotatable about a rotational axis P1 along a plane parallel to the knob moving direction. The engaging portion 41b is provided at the tip of the hook 41 and can engage the hook receiving portion 42. The hook biasing spring 43 rotationally biases the hook 41 relative to the knob 51 in a direction in which the engaging portion 41b of the hook 41 engages the hook receiving portion 42 of the container 20.

Figure 3:
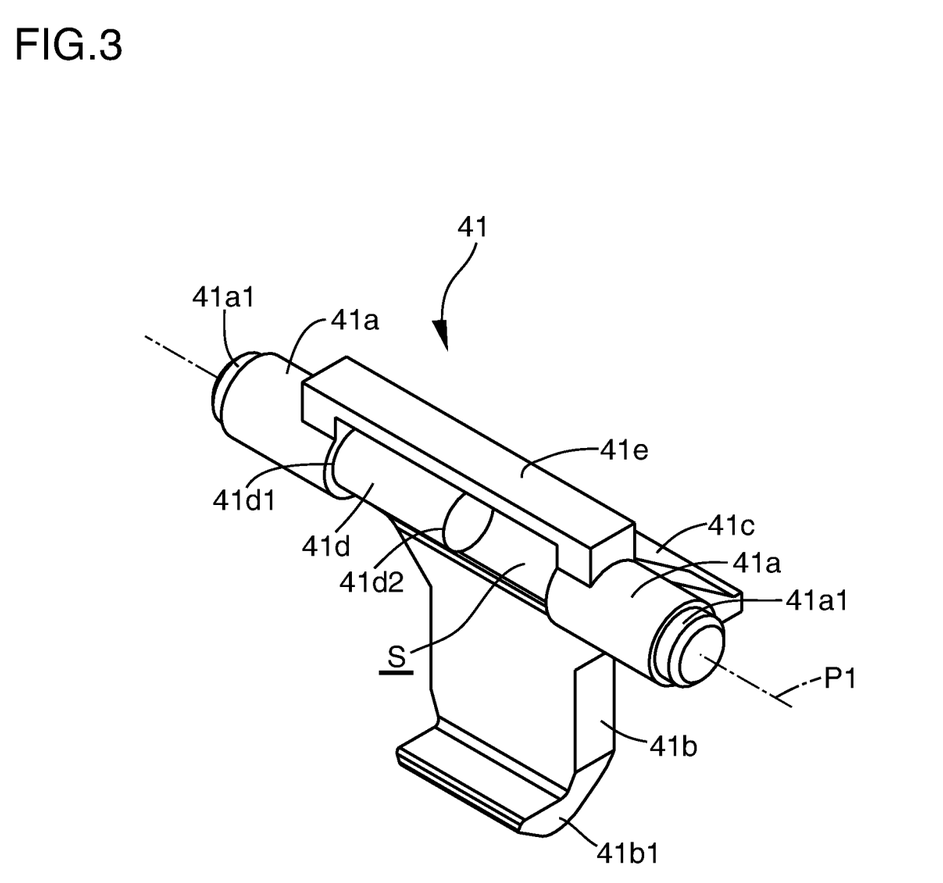
FIG. 3 is an enlarged perspective view of the hook of the interior apparatus of a vehicle according to FIG. 1.

The hook 41 is made from resin. The hook 41 may be a single part or a plurality of parts fixed to each other by welding or fastening. The rotational axis P1 of the hook 41 extends in a direction (a right-left direction of the vehicle) perpendicular to the knob moving direction B. As illustrated in FIG. 3, the hook 41 includes a shaft portion 41a rotatably supported by the knob 51, the engaging portion 41b capable of engaging the hook receiving portion 42 and a stopper 41c.

The shaft portion 41a has a small diameter portion 41a1 at each of opposite ends of the shaft portion 41a. The shaft portion 41a is rotatably supported by the knob 51 at the small diameter portion 41a1 of the shaft portion 41. The shaft portion 41a has opposite end portions spaced from each other in a longitudinal direction of the shaft portion 41a. A spring support 41d for supporting the hook biasing spring 43 is provided between the opposite end portions of the shaft portion 41a. The spring support 41d is formed in a form of a cylindrical rod and extends in the longitudinal direction of the shaft portion 41a. One end 41d1 of the spring support 41d is connected to one of the opposite end portions of the shaft portion 41a and the other end 41d2 of the spring support 41d is formed in a form of a free end. A space S is provided between the other end 41d2 of the spring support 41d and the other of the opposite end portions of the shaft portion 41a opposing the spring support 41d in the longitudinal direction of the shaft portion 41a. The hook biasing spring 43 is mounted onto the spring support 41d through the space S when assembling the hook biasing spring 43 onto the spring support 41d. The opposite end portions of the shaft portion 41a which are located opposite sides of a combination of the spring support 41d and the space S are connected to each other via a bridge 41e extending between the opposite end portions of the shaft portion 41a, thereby securing a strength of the shaft portion 41a.

Figure 5:
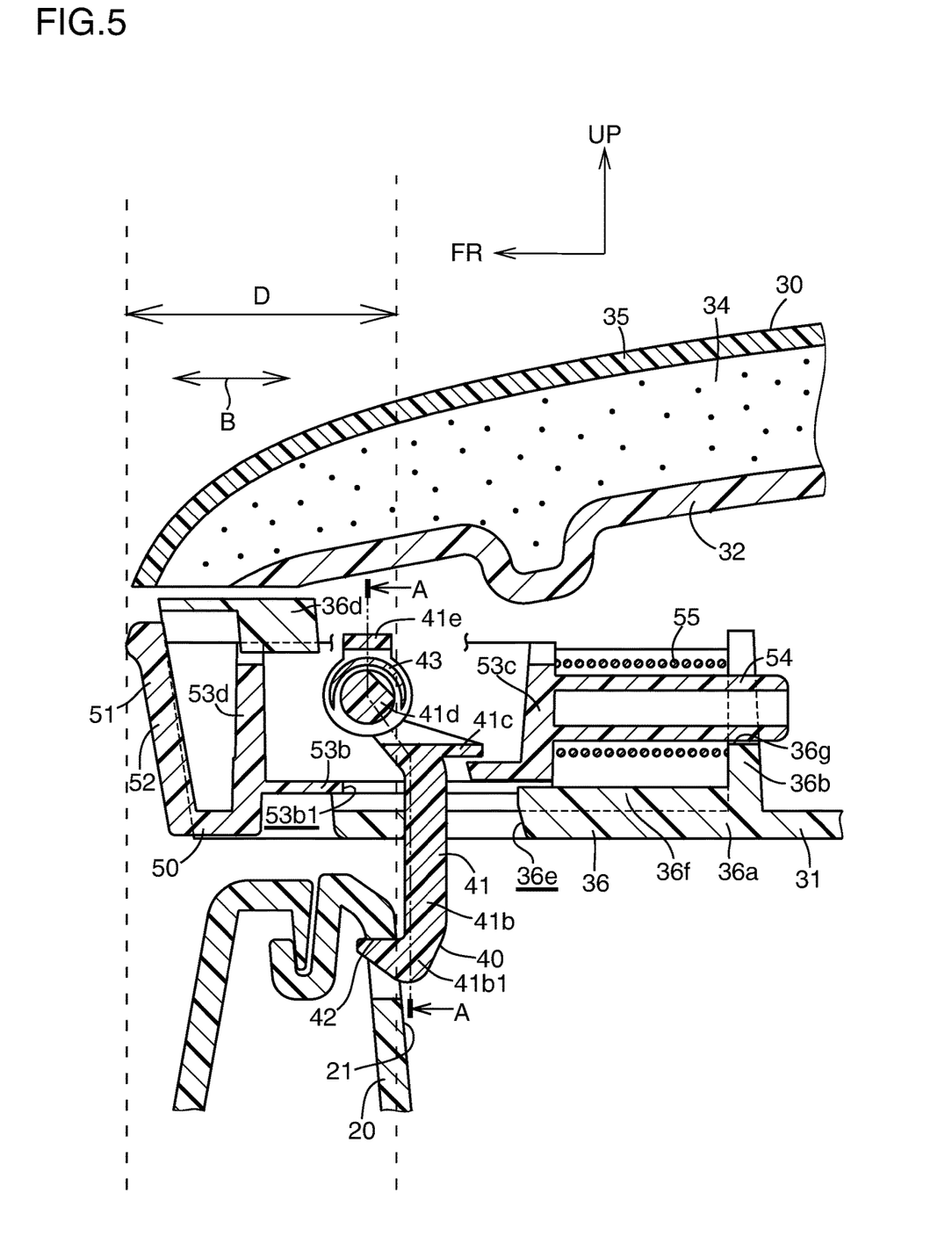
FIG. 5 is an enlarged, partial cross-sectional view of the interior apparatus of a vehicle according to FIG. 1, when the lid is at a closed position.

The engaging portion 41b includes an arm and an engaging hook provided at a lower end 41b1 of the engaging portion 41b. The arm of the engaging portion 41b extends from the shaft portion 41a in a direction perpendicular to the longitudinal direction of the shaft portion 41a. The arm of the engaging portion 41b extends downward from the shaft portion 41a when the lid 30 is at the closed position. As illustrated in FIG. 5, the arm of the engaging portion 41b extends through an aperture 53b1 provided at the knob 51 and the penetrating aperture 36e of the lid 30 and protrudes downward from the lid 30. The engaging hook of the engaging portion 41b is capable of engaging with the hook receiving portion 42 provided at the container 20. The lower end 41b1 of the engaging portion 41b is bent frontward in the front-rear direction of a vehicle to form the engaging hook when the lid 30 is at the closed position so that the engaging portion 41b is capable of engaging with the hook receiving portion 42 at the engaging hook formed at the lower end 41b1 of the engaging portion 41b.

The stopper 41c protrudes from the shaft portion 41a and/or the engaging portion 41b. The stopper 41c protrudes in a direction perpendicular to the longitudinal direction of the shaft portion 41a and in a direction perpendicular to an extending direction of the engaging portion 41b. The stopper 41c is brought into contact with a bottom wall 53b of the knob 51 when the hook 41 is rotated by the hook biasing spring 43, whereby a rotatable range of the hook 41 due to the hook biasing spring 43 relative to the knob 51 is regulated.

As illustrated in FIG. 2, the hook biasing spring 43 may be, for example, a torsion spring. The hook biasing spring 43 includes a coil 43a, a first arm 43b connected to one end of the coil 43a located in an axial direction of the coil 43a and a second arm 43c connected to the other end of the coil 43a located in the axial direction of the coil 43a. The spring support 41d is inserted in the coil 43a. The first arm 43b contacts the hook 41. The second arm 43c contacts the knob 51. The hook 41 is rotationally biased by the hook biasing spring 43 relative to the knob 51 in a direction in which the engaging portion 41b of the hook 41 engages the hook receiving portion 42 of the container 20.

[Lock Releasing Device]

The knob 51 of the lock releasing device 50 is slidably supported by the lid 30 so as to be movable relative to the knob 51 in the knob moving direction B. The knob 51 is made from resin. The knob 51 may be constructed from a single member or a plurality of members coupled to each other. The knob 51 includes an operating portion 52, a hook supporting portion 53 for supporting the hook 41 and a spring supporting portion 54 for supporting the knob biasing spring 55.

Figure 4:
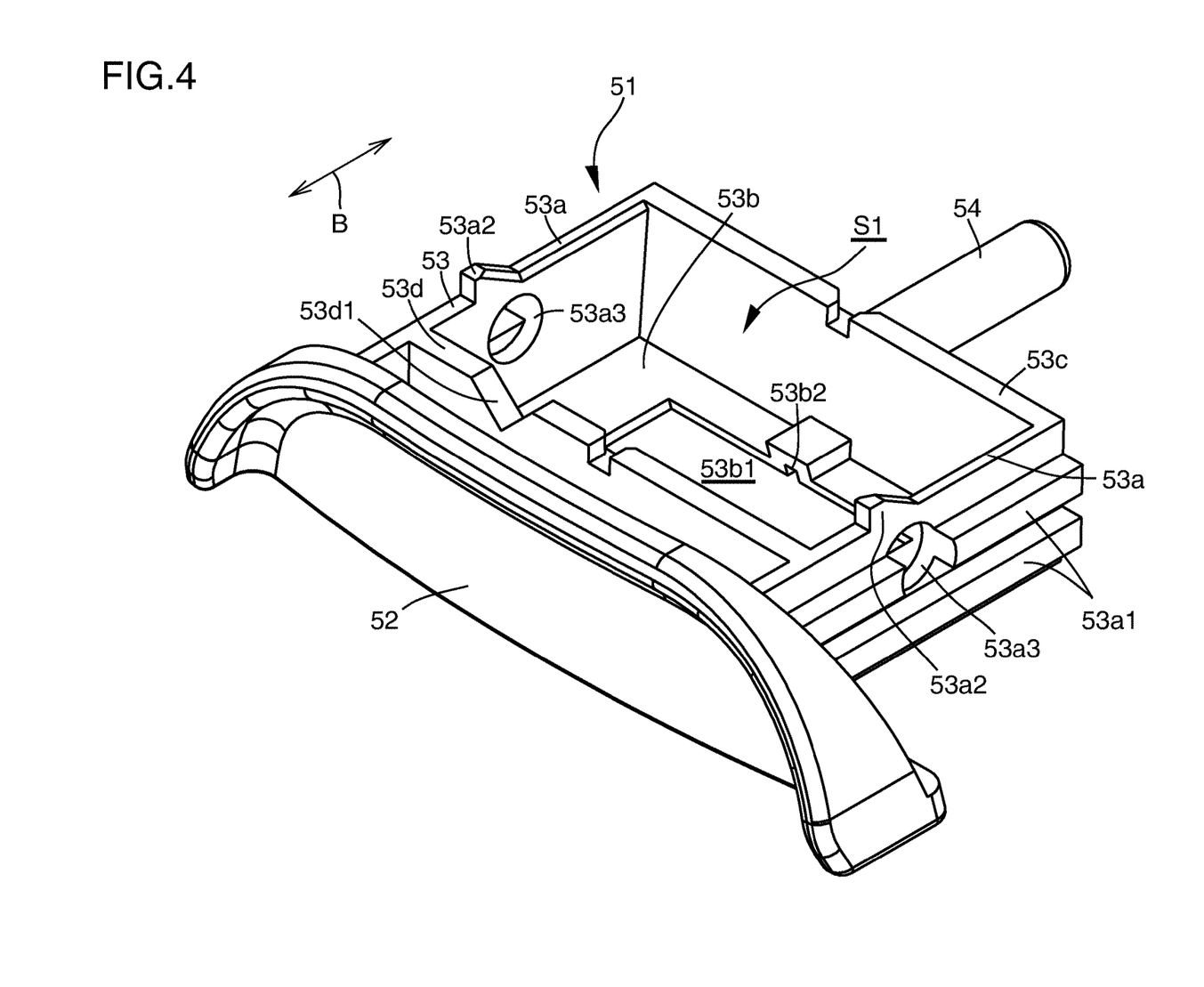
FIG. 4 is an enlarged perspective view of the knob of the interior apparatus of a vehicle according to FIG. 1.

The operating portion 52, the hook supporting portion 53 and the spring supporting portion 54 are disposed at the knob 51 in that order (i.e., in an order of the operating portion 52, the hook supporting portion 53 and the spring supporting portion 54) in the knob moving direction B. Therefore, the hook supporting portion 53 is located on a front side of the knob biasing spring 55. The hook supporting portion 53 is provided at an intermediate portion of the knob 51 in the knob moving direction B. The knob 51 is operated by operating the operating portion 52. As illustrated in FIG. 4, the hook supporting portion 53 includes a pair of side walls 53a extending in the knob moving direction B, a bottom wall 53b, a rear wall 53c extending in a direction perpendicular to the knob moving direction B at rear ends of the side walls 53a and a connecting wall 53d extending in the direction perpendicular to the knob moving direction B at intermediate portions of the side walls 53a. The pair of side walls 53a, the bottom wall 53b, the rear wall 53c and the connecting wall 53d define a space S1 open upward.

Each of the pair of side walls 53a of the hook supporting portion 53 includes a slide rail 53a1 and a stopper 53a2. The slide rail 53a1 is formed at an outside surface of each of the pair of the side walls 53a and extends in the knob moving direction B. The slide rail 53a1 is slidably supported by the slide rail guide 36h of the lid 30. The slide rail 53a1 may be provided over an entire length of the side wall 53a of the hook supporting portion 53 in the knob moving direction B. The stopper 53a2 is provided in order to prevent the knob 51 from being drawn out from the lid 30. The stopper 53a2 is formed at an intermediate portion of an upper surface of each of the pair of side walls 53a so as to protrude upward. When the knob 51 is biased by the knob biasing spring 55, the stopper 53a2 is brought into contact with the stopper receiving portion 36d1 provided at the lid 30, whereby the knob 51 is prevented from being drawn out from the lid 30.

As illustrated in FIGS. 2 and 4, the aperture 53b1 through which the engaging portion 41b of the hook 41 extends is formed at the bottom wall 53b of the hook supporting portion 53. A guide receiving portion 53b2 is formed at the bottom wall 53b of the hook supporting portion 53. The guide 36f of the lid 30 protrudes into the guide receiving portion 53b2 of the knob 51 and slidably contacts the guide receiving portion 53b2. When the knob 51 is moved relative to the lid 30, the guide receiving portion 53b2 of the knob 51 is moved in the front-rear direction of a vehicle guided by the guide 36f of the lid 30, whereby the knob 51 is prevented from moving relative to the lid 30 in the right-left direction of a vehicle. The connecting wall 53d of the hook supporting portion 53 connects the side walls 53a of the hook supporting portion 53 to each other. An arm engaged portion 53d1 is formed at the connecting wall 53d of the hook supporting portion 53. When the hook biasing spring 43 is installed to the knob 51, the second arm 43c of the hook biasing spring 43 engages the arm engaged portion 53d1.

Figure 6:
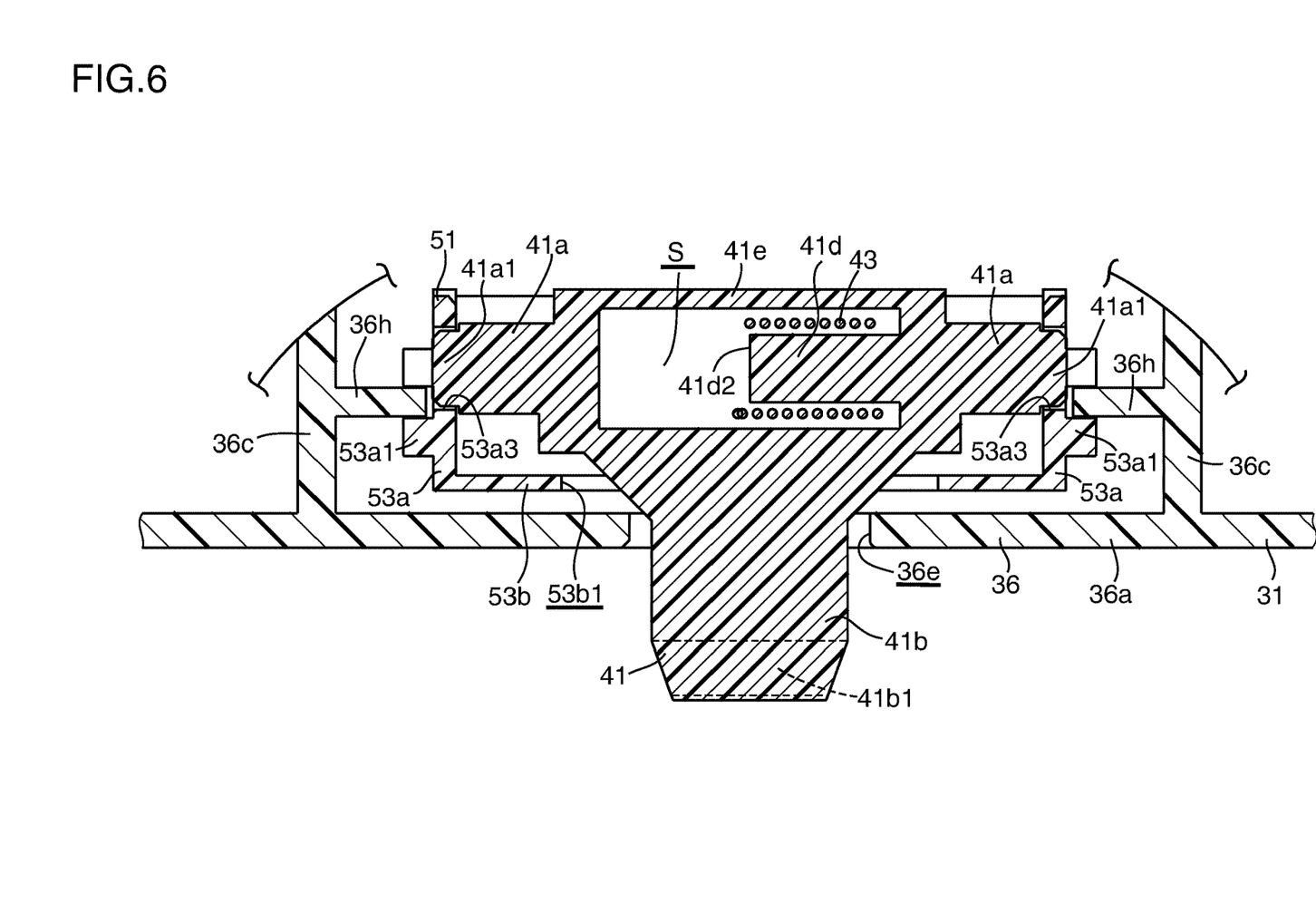
FIG. 6 is a cross-sectional view of the apparatus of FIG. 5 taken along line A-A of FIG. 5.
Figure 7:
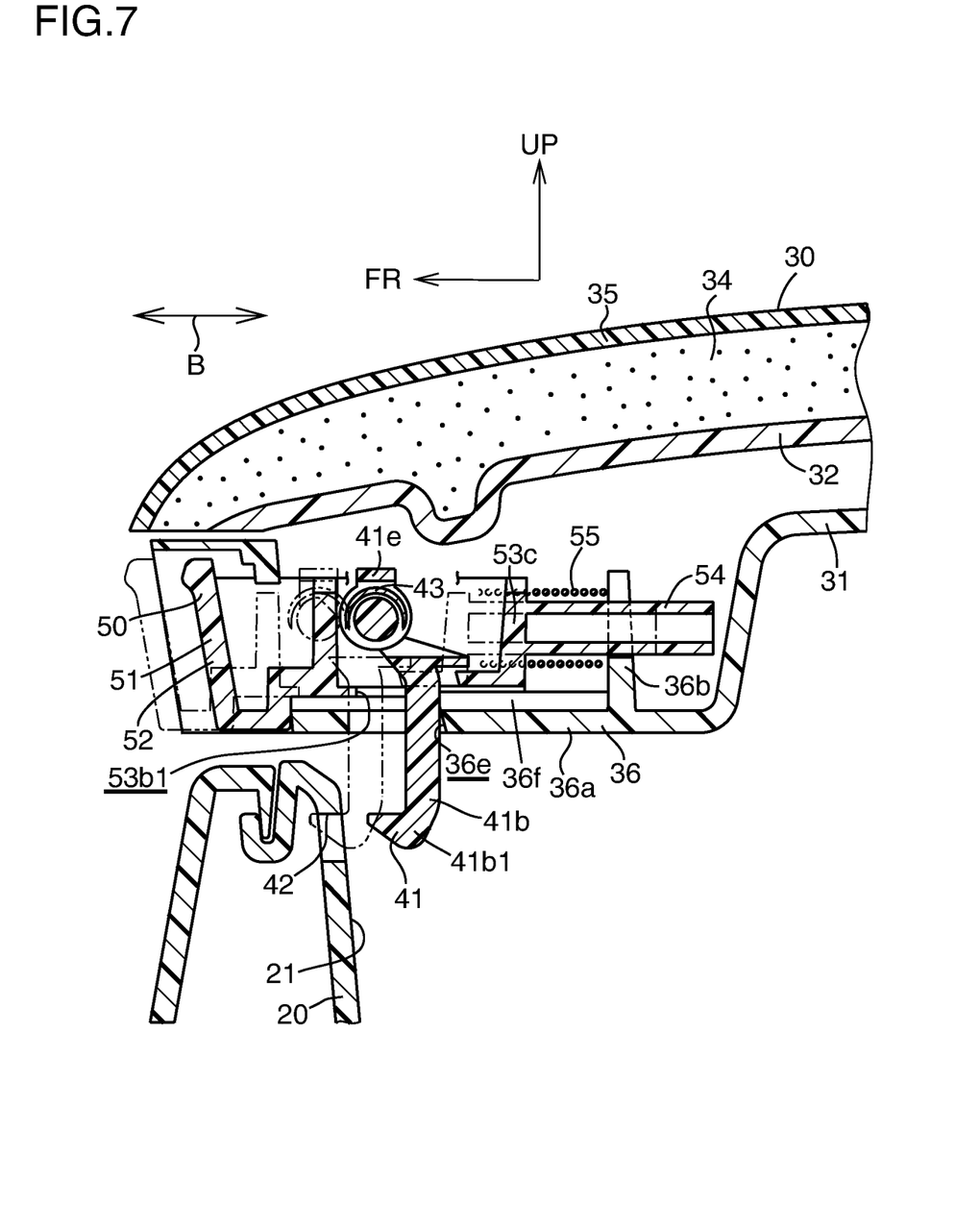
FIG. 7 is an enlarged, partial cross-sectional view of the interior apparatus of a vehicle according to FIG. 1, when a lock device is unlocked.
Figure 9:
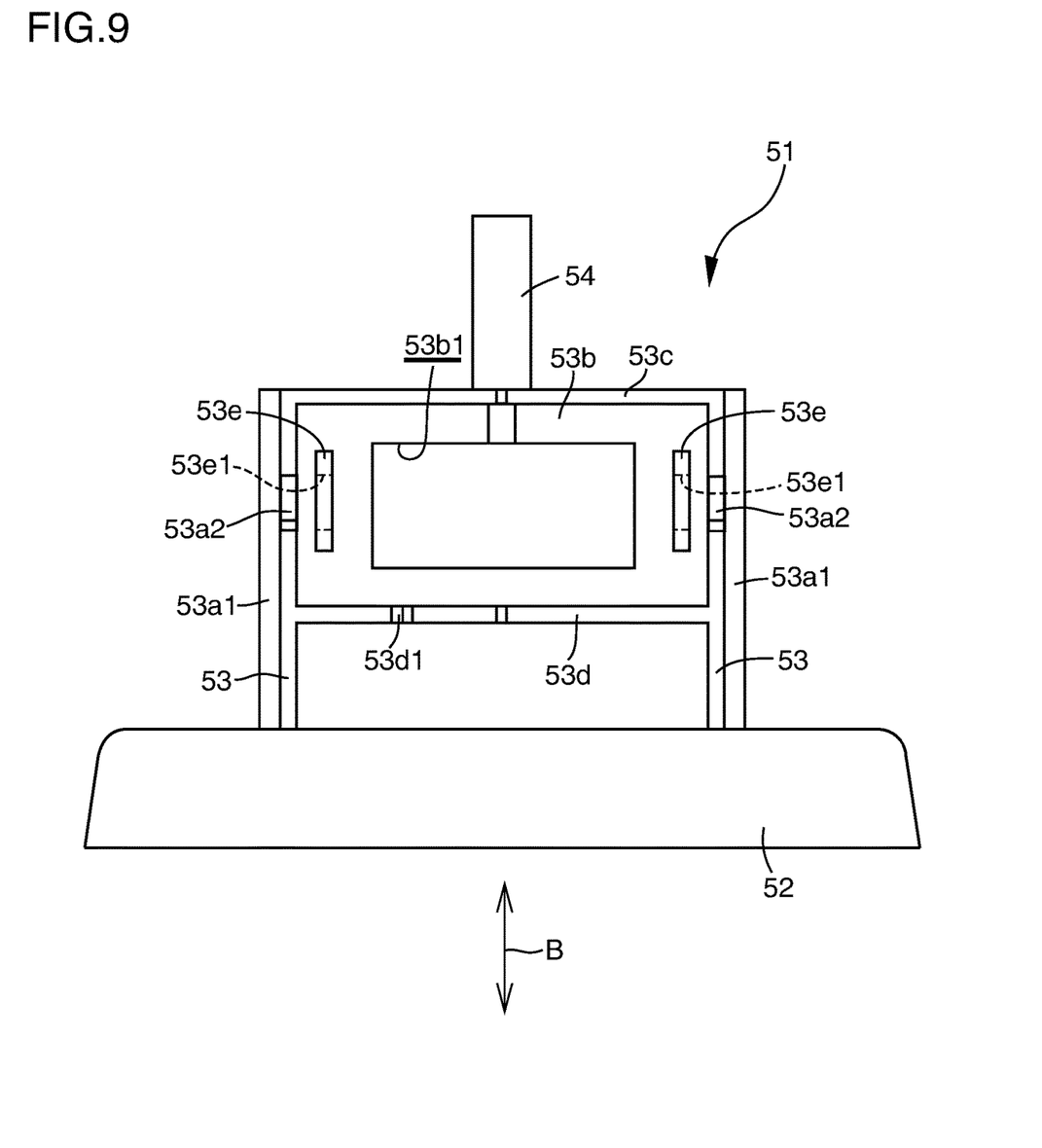
FIG. 9 is an enlarged, schematic plan view of a knob of an interior apparatus of a vehicle according to an alternative embodiment of the present invention.
Figure 10:
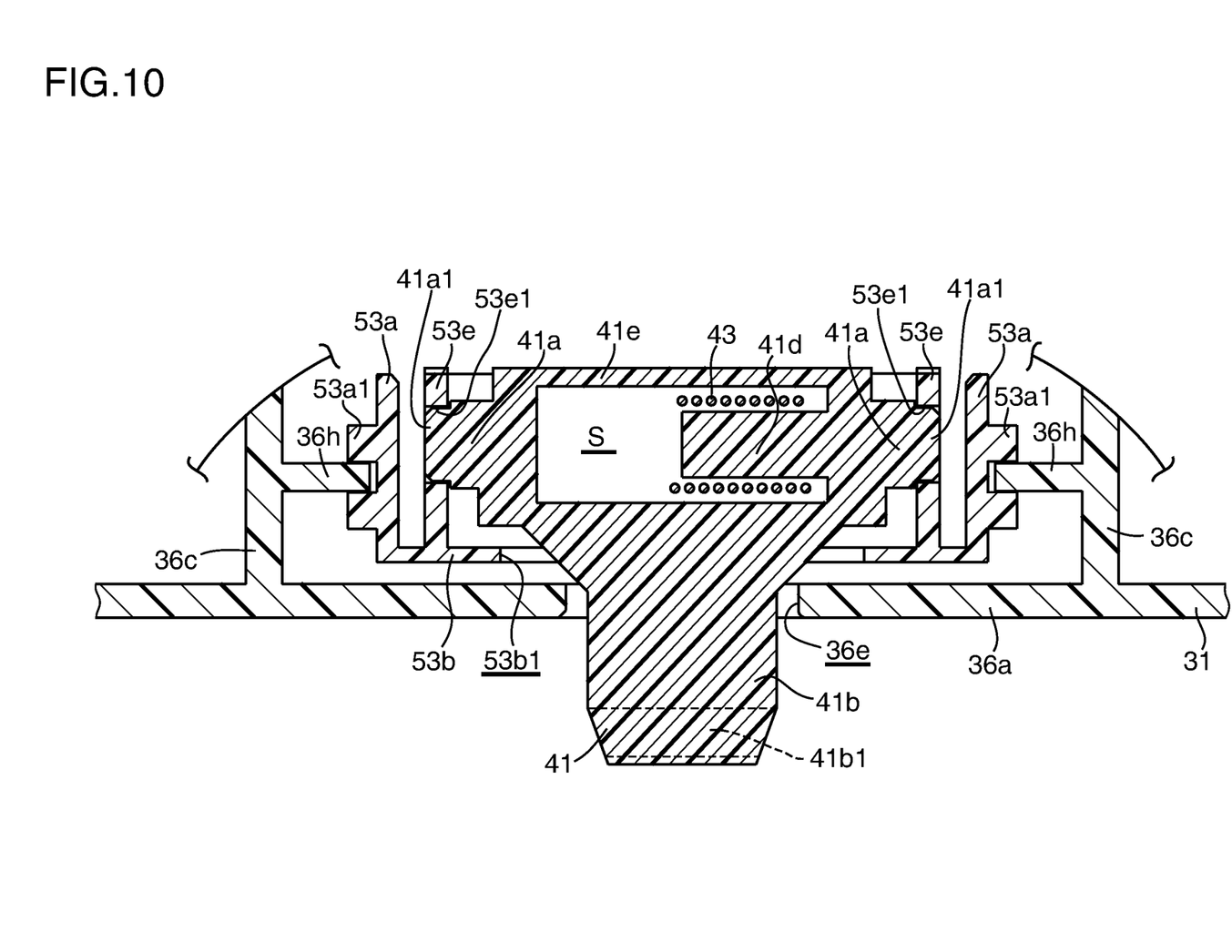
FIG. 10 is an enlarged, schematic cross-sectional view of the interior apparatus of a vehicle according to an alternative embodiment of the present invention.

As illustrated in FIG. 6, the shaft portion 41a of the hook 41 is rotatably supported by a bearing 53a3 provided at each of the pair of side walls 53a of the hook supporting portion 53 of the knob 51. However, as illustrated in FIGS. 9 and 10, in a case where a pair of ribs 53e is provided inside of the pair of side walls 53a of the hook supporting portion 53, the shaft portion 41a of the hook 41 may be rotatably supported by a bearing 53e1 formed at each of the pair of ribs 51.

As illustrated in FIG. 2, the spring supporting portion 54 protrudes rearward from the rear wall 53c of the hook supporting portion 53. A cross-sectional shape of the spring supporting portion 54 taken along a plane perpendicular to a longitudinal direction of the spring supporting portion 54 may be a hollow circle or a solid circle. The spring supporting portion 54 extends through the slit 36g of the lid 30. The knob biasing spring 55 of the lock releasing device 50 is, for example, a coil spring.

The lock device 40 and the lock releasing device 50 are coupled to the lid 30 as explained below. First, (a) the knob biasing spring 55 is coupled to the spring supporting portion 54 of the knob 51, and the knob 51 with the knob biasing spring 55 is coupled to the slidably holding portion 36 of the lid 30 from a front side of a vehicle. When the knob 51 with the knob biasing spring 55 passes the slidably holding portion 36 of the lid 30 and the stopper 53a2 of the knob 51 begins to contact the stopper receiving portion 36d1 of the lid 30, the stopper receiving portion 36d1 of the lid 30 is pushed upward by the stopper 53a2 to be elastically deformed upward. When the stopper 53a2 has passed the stopper receiving portion 36d1, the stopper receiving portion 36d1 returns to its original position due to its elasticity. Then, (b) the hook biasing spring 43 is coupled to the hook 41, and the hook 41 with the hook biasing spring 43 is coupled to the knob 51 from upside. The steps (a) and (b) above are conducted without using a screw and/or bolt and without reversing the lid 30.

Next, operation and technical advantages of the present invention will be explained. Since the hook 41 of the lock device 40 is rotatably supported by the knob 51, a biasing force of the hook biasing spring 43 can be determined independent of a biasing force of the knob biasing spring 55. Therefore, the biasing force of the hook biasing spring 43 can be set smaller than the biasing force of the knob biasing spring 55. As a result, when locking the lock device 40, a sound due to a collision of the hook 41 with the container 20 can be decreased.

Since the biasing force of the hook biasing spring 43 can be determined independent of the knob biasing spring 55, even if the operating force of the knob 51 is changed, the biasing force of the hook biasing spring 43 is not required to be changed.

Figure 8:
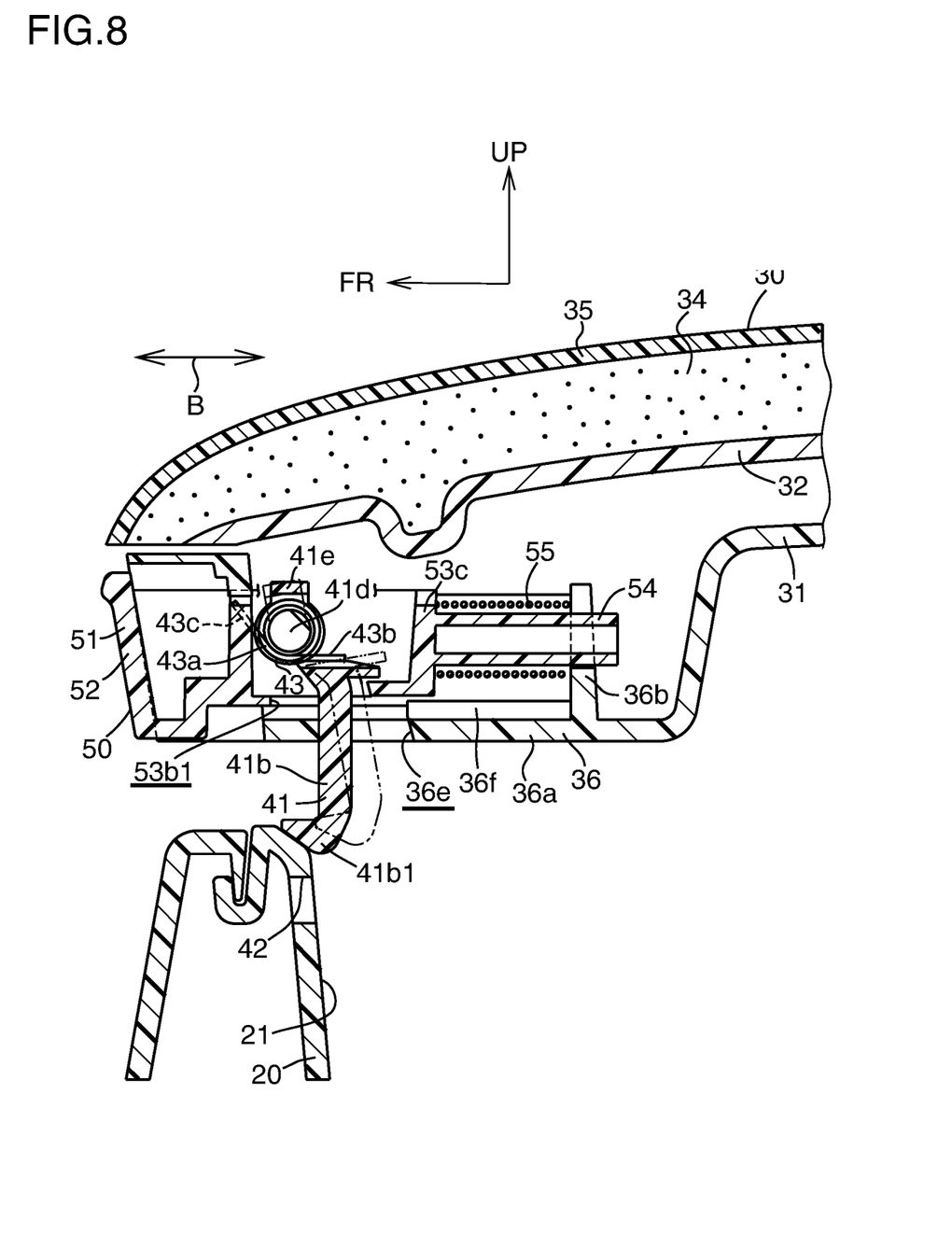
FIG. 8 is an enlarged, partial cross-sectional view of the interior apparatus of a vehicle according to FIG. 1, when the lid is being closed.

As illustrated in FIG. 8, since the hook 41 of the lock device 40 is rotatably supported by the knob 51, it is possible to move the hook 41 without moving the knob 51 when locking the lock device 40. As a result, when locking the lock device 40, a sound generated at the time of sliding of the hook 41 can be decreased.

Since the hook 41 of the lock device 40 is rotatably supported by the knob 51, the sound generated at the time of sliding of the hook 41 can be more decreased than in a case where the hook 41 is slidably supported by the knob 51.

As illustrated in FIG. 2, since the knob 51 includes the slide rail 53a1 extending in the knob moving direction B, the lid 30 includes the slide rail guide 36h extending in the knob moving direction B and the slide rail 53a1 slides along the slide rail guide 36h, the knob 51 can move smoothly relative to the lid 30.

In order to enable the knob 51 to move smoothly relative to the lid 30, a certain length of the slide rail 53a1 is necessary. Since the slide rail 53a1 is provided at the hook supporting portion 53, the hook supporting portion 53 necessarily has a length equal to or more than the length of the slide rail 53a1 in the knob moving direction B. As a result, a space for disposing the hook 41 at the hook supporting portion 53 can be secured easily.

Since the hook 41 includes the shaft portion 41a, the hook 41 can be supported by the knob 51 at the shaft portion 41a of the hook 41. Further, since the aperture 53b1 through which the engaging portion 41b of the hook 41 extends is formed at the bottom wall 53b of the hook supporting portion 53 of the knob 51, even though the hook 41 is rotatably supported at the hook supporting portion 53 of the knob 51, the hook 41 can extend through the aperture 53b1 and can engage the hook receiving portion 42 of the container 20 at the engagement portion 41b of the hook 41.

As illustrated in FIG. 5, since the hook 41 is supported at the hook supporting portion 53 located at the intermediate portion of the knob 51, a distance D between the hook 41 and a front end of the lid 30 in the front-rear direction of a vehicle can be made smaller than in a case where the hook 41 is disposed on a rear side of the knob 51. Further, since the operating portion 52, the hook supporting portion 53 and the spring supporting portion 54 are disposed in an order of the operating portion 52, the hook supporting portion 53 and the spring supporting portion 54, a distance D between the hook 41 and a front end of the lid 30 in the front-rear direction of a vehicle can be made smaller than in a case where the hook supporting portion 53 is located on a rear side of the knob biasing spring 55. As a result, the hook engaging portion 42 provided at the container 20 can be provided at a position close to a front end in the front-rear direction of a vehicle, of the container 20. As a result, a volume of the housing space 21 of the container 20 can be easily made bigger.

EXPLANATION OF REFERENCE NUMERALS 10 interior apparatus of a vehicle
20 container
21 housing space
30 lid
31 inner member of the lid
32 outer member of the lid
33 hinge
36 slidable holding portion for slidably holding a lock releasing device
36a bottom wall of the slidable holding portion
36b rear wall of the slidable holding portion
36c side wall of the slidable holding portion
36d bridge of the slidable holding portion
36d1 stopper receiving portion
36e penetrating aperture formed at the bottom wall of the slidable holding portion
36f guide
36h slide rail guide
40 lock device
41 hook
41a shaft portion
41b engaging portion (including an arm and an engaging hook)
41c stopper
41d spring support
41e bridge
42 hook receiving portion
43 hook biasing spring
50 lock releasing device
51 knob
52 operating portion
53 hook supporting portion
53a side wall of the hook supporting portion
53a1 slide rail
53a2 stopper
53a3 bearing
53b bottom wall of the hook supporting portion
53b1 aperture (formed at the bottom wall of the hook supporting portion of the knob)
53b2 guide receiving portion
53c rear wall of the hook supporting portion
53d connecting wall of the supporting portion
53e rib
53d1 spring engaging portion (for engaging a spring arm of the hook biasing spring)
54 spring supporting portion
55 knob biasing spring

What is claimed is:

1. An interior apparatus of a vehicle comprising:
   a container;
   a lid rotatably supported by the container so as to be rotatable between an open position and a closed position of the lid;
   a lock device for locking the lid to the container when the lid is at the closed position; and
   a lock releasing device, provided at the lid, for releasing the locking of the lid to the container, wherein
   the container includes a hook receiving portion provided at the container,
   the lock releasing device includes a knob of a push-type supported by the lid so as to be movable straight in a knob moving direction including push and opposite-push directions of the knob and a knob biasing spring for biasing the knob in the opposite-push direction of the knob, and
   the lock device includes a hook, rotatably supported by the knob so as to be rotatable along a plane parallel to the knob moving direction, having an engaging portion capable of engaging the hook receiving portion at a tip of the hook and a hook biasing spring for rotationally biasing the hook in a direction in which the engaging portion of the hook engages the hook receiving portion of the container.

2. The interior apparatus of a vehicle according to claim 1, wherein
   the knob includes a slide rail extending in the knob moving direction, and
   the lid includes a slide rail guide extending in the knob moving direction, the slide rail sliding guided by the slide rail guide.

3. The interior apparatus of a vehicle according to claim 2, wherein
   the knob includes an operating portion and a hook supporting portion where the hook is rotatably supported by the knob, and
   the slide rail is provided at the hook supporting portion.

4. The interior apparatus of a vehicle according to claim 3, wherein
the hook includes a shaft portion and the engaging portion,
the hook is rotatably supported by the knob at the shaft portion of the hook,
the hook engages the hook receiving portion of the container at the engaging portion of the hook when the lid is at the closed position,
the hook supporting portion of the knob includes a side wall and a bottom wall,
the slide rail is provided at the side wall of the hook supporting portion, and
an opening through which the hook extends is formed at the bottom wall of the hook supporting portion.

5. The interior apparatus of a vehicle according to claim 1, wherein a biasing force of the hook biasing spring for biasing the engaging portion of the hook to the hook receiving portion of the container is set smaller than a biasing force of the knob biasing spring for biasing the engaging portion of the hook to the hook receiving portion of the container via the knob.

6. The interior apparatus of a vehicle according to claim 1, wherein
the knob includes an operating portion, a hook supporting portion for supporting the hook and a spring supporting portion for supporting the knob biasing spring,
the operating portion, the hook supporting portion and the spring supporting portion are disposed in an order of the operating portion, the hook supporting portion and the spring supporting portion, and
the hook is rotatably supported by the knob at the hook supporting portion.

7. The interior apparatus of a vehicle according to claim 1, wherein
the container includes a front wall which is constructed from a frontmost wall or a wall provided inside the frontmost wall, and
the hook receiving portion is constructed from a hole formed at the front wall of the container.

8. The interior apparatus of a vehicle according to claim 1, wherein
the interior apparatus of a vehicle is a center console of a vehicle.

* * * * *